United States Patent [19]

Arai et al.

[11] 4,261,217
[45] Apr. 14, 1981

[54] TRANSMISSION EQUIPPED WITH AUXILIARY SPEED CHANGING GEAR

[75] Inventors: Hajime Arai, Aichi; Akio Numazawa, Nagoya, both of Japan

[73] Assignee: Toyota Jidosha Kogyo Kabushiki Kaisha, Toyota, Japan

[21] Appl. No.: 952,216

[22] Filed: Oct. 17, 1978

[30] Foreign Application Priority Data

Jul. 20, 1978 [JP] Japan .................................. 53/88839

[51] Int. Cl.³ .............................................. F16H 3/08
[52] U.S. Cl. ..................................................... 74/360
[58] Field of Search ......................... 74/330, 359, 360

[56] References Cited

U.S. PATENT DOCUMENTS

| | | | |
|---|---|---|---|
| 2,542,911 | 2/1951 | Eaton | 74/360 X |
| 2,549,896 | 4/1951 | Dunham | 74/360 X |
| 2,570,192 | 10/1951 | Beckwith | 74/330 X |
| 2,953,943 | 9/1960 | Arnold | 74/330 X |
| 3,600,963 | 8/1971 | Portmann | 74/360 |

Primary Examiner—C. J. Husar
Assistant Examiner—Frank Mc Kenzie
Attorney, Agent, or Firm—Cushman, Darby & Cushman

[57] ABSTRACT

A transmission has a drive gear shaft disposed coaxially with an input shaft which extends in parallel with an output shaft. Two pairs of meshing gears, one of which constituting a gear train of high speed gear ratio while the other constitutes a gear train of low speed gear ratio, are arranged for the torque transmission from the input shaft to the drive gear shaft. The drive gear shaft is connected to the output shaft through a plurality of meshing speed gear pairs such as first gear pair, second gear pair, third gear pair and fourth gear pair, as in the ordinary transmission. In operation, one of the gear trains of the high speed and low speed gear ratios is selectively engaged, so that each of the speed gears may be operated at either the high speed range or the low speed range. The transmission is small-sized, light weight and less expensive, thanks to the coaxial arrangement of the input shaft and the drive gear shaft and, therefore, can suitably be used in small-sized vehicles having limited installation space preserved for the transmission.

2 Claims, 9 Drawing Figures

4,261,217

TRANSMISSION EQUIPPED WITH AUXILIARY SPEED CHANGING GEAR

BACKGROUND OF THE INVENTION

The present invention relates to a transmission equipped with an auxiliary speed changing gear.

The transmission of the kind mentioned above is usually used in such a heavy-duty vehicle having an engine the power of which is relatively small for the heavy load of the vehicle, in order to ensure a sufficiently high running performance of the vehicle assisting the small power of the engine.

In case of so-called front engine and front-wheel driving type vehicles and so-called rear engine and rear-wheel driving type vehicles in which the installation space for the transmission is extremely limited, it is necessary to provide an additional gear shaft, for constructing an auxiliary speed changing gear. This additional gear shaft inconveniently incurs increase of installation space, weight of the transmission and the cost of the vehicle. For this reason, the transmission having an auxiliary speed changing gear could not be used successfully in small-sized vehicles of the above mentioned type.

In order to make the minimized fuel consumption rate and the sufficiently high running performance compatible with each other, over various running modes including expressway-cruising, negotiating urban traffic snarls, hill-climbing and descending in mountainous areas, the number of speed changing ratios to be performed by the transmission has to be as large as 6 to 10. The shifting operation with a transmission having such a large number of speed changing ratios is extremely troublesome.

In case of passenger cars, the output power of the engine is sufficiently large, so that the transmission may be shifted two stages, i.e. skipping over the intervening gear.

SUMMARY OF THE INVENTION

Under these circumstances, the present invention aims at providing a multistage transmission having high and low speed ranges of speed changing, such that each of the gears of the transmission, e.g. the first gear, second gear and so forth can be operated at the selected one of the high speed and low speed ranges. Thus, for cruising of a passenger car on expressway or the like smooth road, the high speed range may be selected so that each gear is operated at its high speed range, whereas, for urban traffic which requires repeated starting and stopping, as well as for running along rolling and winding roads in mountainous areas, the low speed range may be selected so that each gear may be operated at its low speed range. Thus, the transmission is usually fixed at either one speed range of high or low speed, and the gear shifting operation is made in the same way as in the ordinary 3 to 5 stage transmission. It will be seen that such an arrangement of the transmission will ensure good running performance and a reduced fuel consumption rate, without being accompanied by a deterioration of maneuverability.

It is therefore an object of the invention to provide a less expensive, lightweight and small-sized transmission which is suitable for use in front engine and front-wheel drive-type automobiles and rear engine and rear-wheel drive-type automobiles, and which can be manufactured without necessitating a substantial modification of the transmission compared to one having no auxiliary speed changing gear.

To this end, according to the invention, there is provided a transmission having an auxiliary speed changing gear, characterized by comprising a drive gear disposed coaxially with an input shaft extending in parallel with an output shaft, and two pairs of meshing gears disposed between the input shaft and the drive gear shaft, one of the gear pairs constituting a gear train of a high speed gear ratio, and the other constituting a gear train of a low speed gear ratio.

The above and other objects, as well as advantageous features of the invention will become more clear from the following description of the preferred embodiments taken in conjunction with the accompanying drawings.

BRIEF DESCRIPTION OF THE DRAWINGS

FIGS. 2 to 7 are skeleton diagrams of the gear trains incorporated in the transmission as shown in FIG. 1 in which:

FIG. 2 illustrates the neutral state of the gear trains in the low speed range,

FIG. 3 illustrates the state of the gear trains when a first gear is selected in the low speed range, FIG. 4 illustrates the state of the gear trains when a second gear is selected in the low speed range, FIG. 5 illustrates the state of the gear trains when a third gear is selected in the low speed range, FIG. 6 illustrates the state of the gear trains when a fourth gear is selected in the low speed range, FIG. 7 illustrates the neutral state of the gear trains in the high speed range.

DESCRIPTION OF THE PREFERRED EMBODIMENTS

Figure 1:
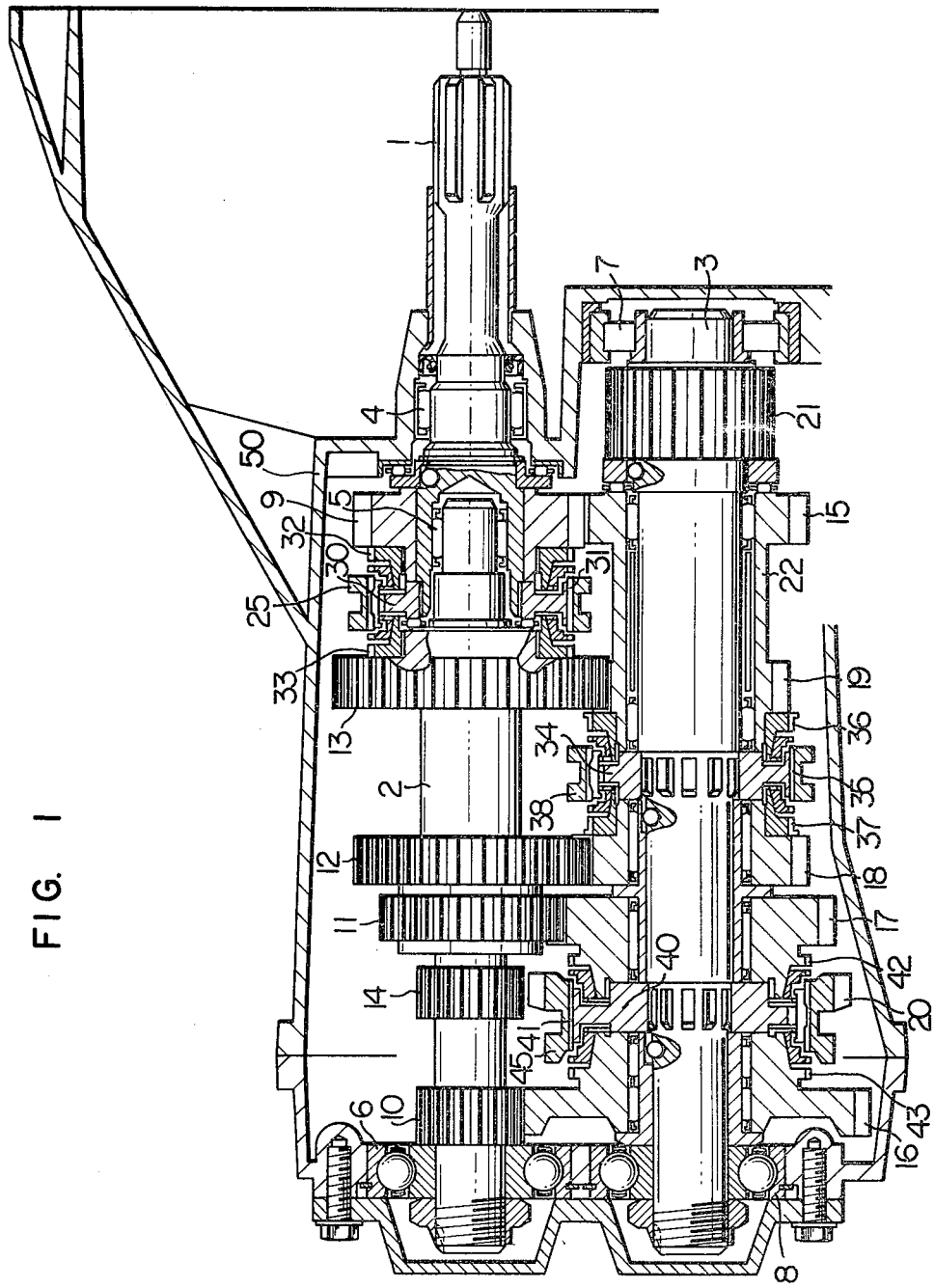
FIG. 1 is a sectional view of an essential part of a transmission in accordance with the invention equipped with an auxiliary speed changing gear.
Figure 2:
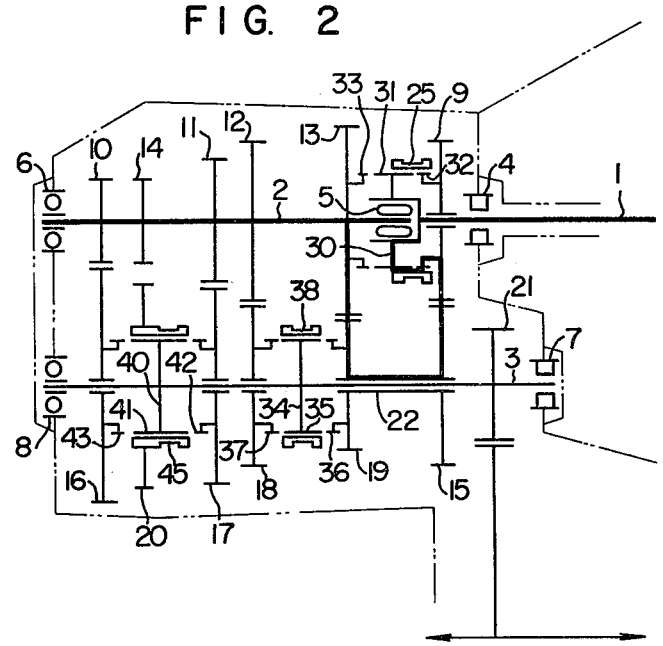
Figure 3:
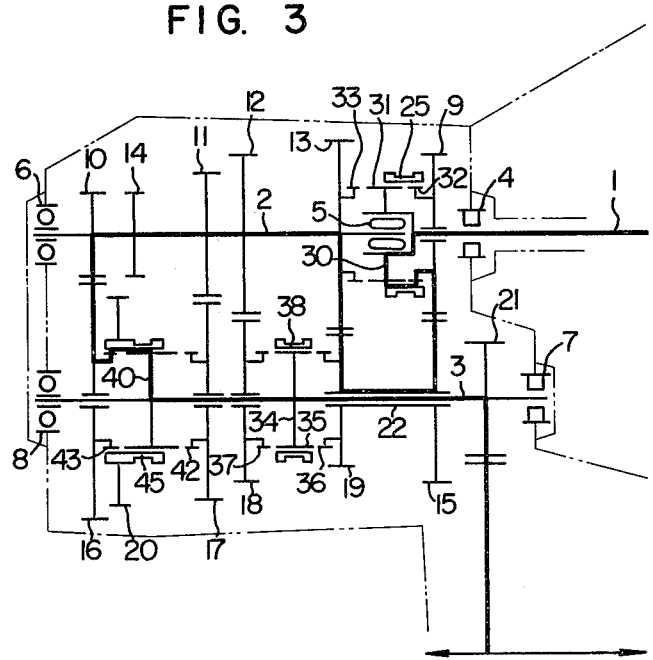
Figure 4:
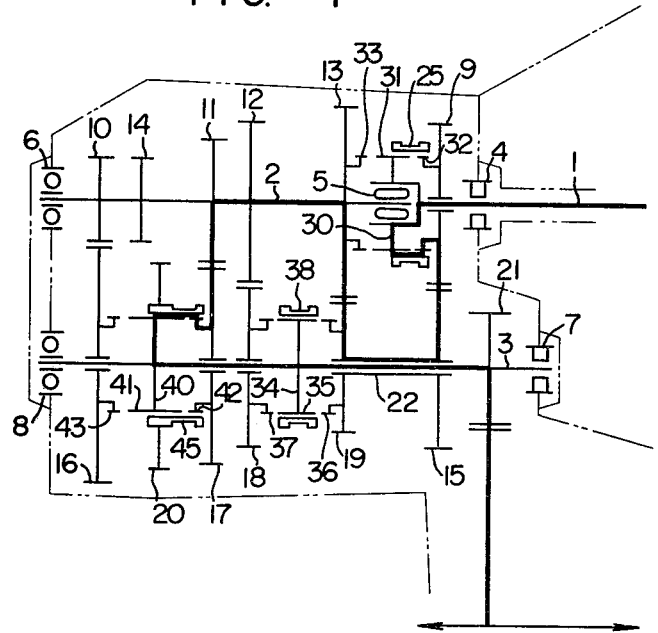
Figure 5:
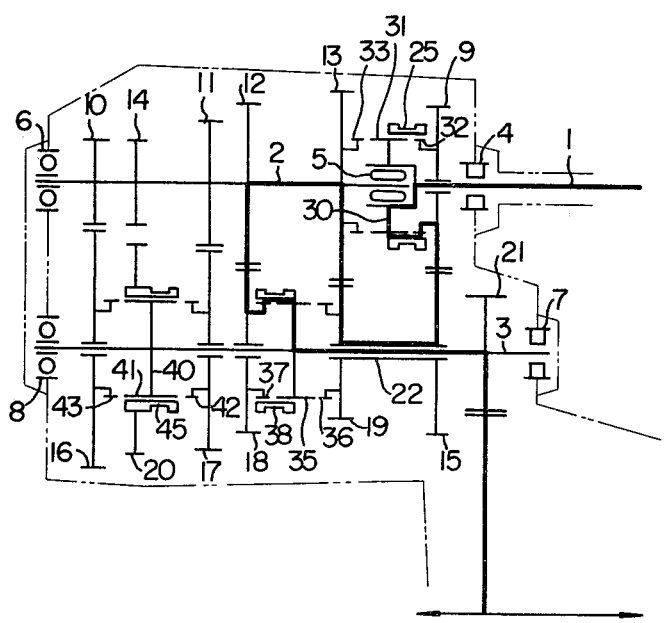

Referring first to FIG. 1 showing in section a transmission in accordance with the invention, and also to FIG. 2 which is a skeleton diagram of the transmission, an input shaft 1 is supported by a transmission case 50, through a bearing 4 and a pilot bearing which in turn is supported by an engine crank shaft (not shown). A spline hub 30 is splined to the input shaft 1. The input shaft 1 rotatably carries a low speed range drive gear 9 at its portion between the hub 30 and the bearing 4. A spline 31 is formed in the outer peripheral surface of the hub 30. A high speed-low speed change-over sleeve 25 is adapted to be slidingly moved along the spline 31 in the axial direction, by means of a shift fork which is not shown.

A drive gear shaft 2 is supported by the transmission case 50, through a pilot bearing 5 and a bearing 6, coaxially with an input shaft. A first drive gear 10, second drive gear 11, third drive gear 12, fourth drive gear 13 and a reverse drive gear 14 are formed unitarily with the drive gear shaft 2 or carried by the latter by means of splines, so that they may be rotated unitarily with the drive gear shaft 2.

A low range drive gear 9 has a spline 32, while the fourth drive gear 13 is provided with a spline 33. These splines are adapted for meshing with the aforementioned sleeve 25. A synchronization mechanism not shown may be provided between the sleeve and the splines 32, 33.

An output shaft 3 is carried by the transmission case 50 through a pair of bearings 7, 8, so as to extend in parallel with the input shaft 1 and the drive gear shaft 2. The output shaft 3 carries a final reduction gear 21 formed unitarily therewith or by means of a spline. At the same time, two spline hubs 34, 40 are carried by the output shaft 3 and fixed to the latter by means of splines or the like.

A hollow gear shaft 22 unitarily carrying a low speed range driven gear 15 and a fourth gear 19 is rotatably mounted on the output shaft 3. Further, a third gear 18, second gear 17 and a first gear 16 are rotatably mounted on the output shaft 3. The gear shaft 22 is disposed between the spline hub 34 and the final reduction gear 21, while the third and the second gears 18, 17 are disposed between two spline hubs 34, 40. The first gear 16 is disposed between the spline hub 40 and the bearing 8.

A spline 35 is formed in the outer peripheral surface of the spline hub 34. A third-fourth change-over sleeve 38 is adapted to be slid along the spline 35 in the axial direction, by means of a shift fork which is not shown, so as to selectively engage one of splines 36, 37 formed on the fourth and the third gears 19, 18. A synchronizing mechanism (not shown) is disposed between the combination of the spline 35 and the sleeve 38, and the splines 36, 37 which are selectively engaged by the sleeve 38.

A spline 41 is formed on the outer periphery of the spline hub 40. A first-second change-over sleeve 45 is adapted to be slided along the spline 41 in the axial direction, by means of a shift fork which is not shown, so as to selectively engage splines 42 and 43 which are formed on the second and the first gears 17, 16 respectively. A synchronizing mechanism (not shown) is provided between the combination of the spline 41 and the sleeve 45, and the splines 42, 43 which are selectively engaged by the sleeve 45.

Figure 8:
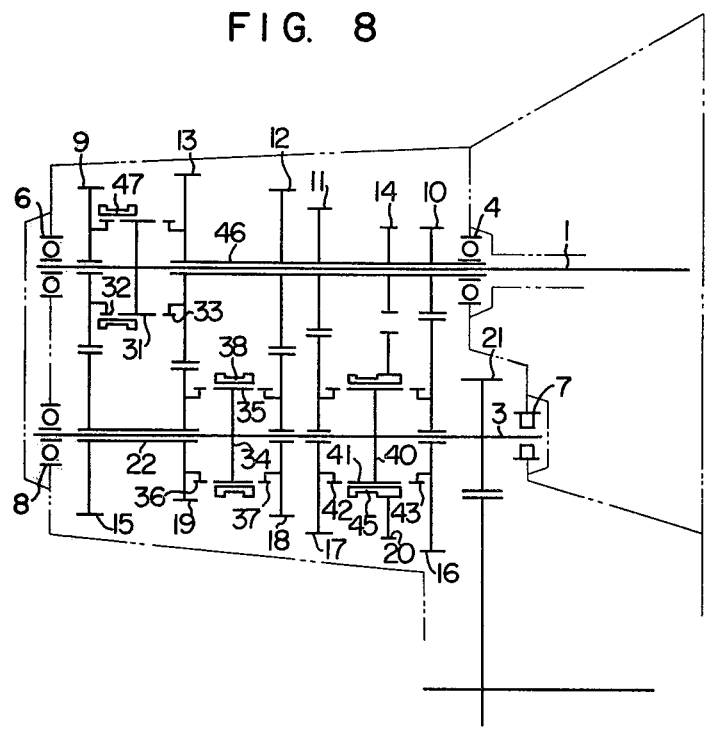
FIG. 8 shows another embodiment in the neutral state of the low speed range.

FIG. 8 is a skeleton diagram of another embodiment of the invention. This embodiment differs from that of FIG. 2 in that the drive gear shaft 46 assumes the form of a hollow shaft coaxially receiving the input shaft, so that the portions constituting the auxiliary speed changing gear are located at the left-hand side portion of FIG. 8, i.e. remote from the engine. Consequently, the pilot bearing 5 as used in the embodiment of FIG. 2 for supporting the input shaft and the drive gear shaft can be eliminated. By locating the auxiliary speed changing gear at the left-hand side portion of the transmission as viewed on the drawing as explained above, the modification of the main transmission required for the mounting of the auxiliary speed changing gear is diminished, so that a transmission having no auxiliary speed changing gear, as well as a transmission having an auxiliary speed changing gear, becomes readily obtainable.

Figure 9:
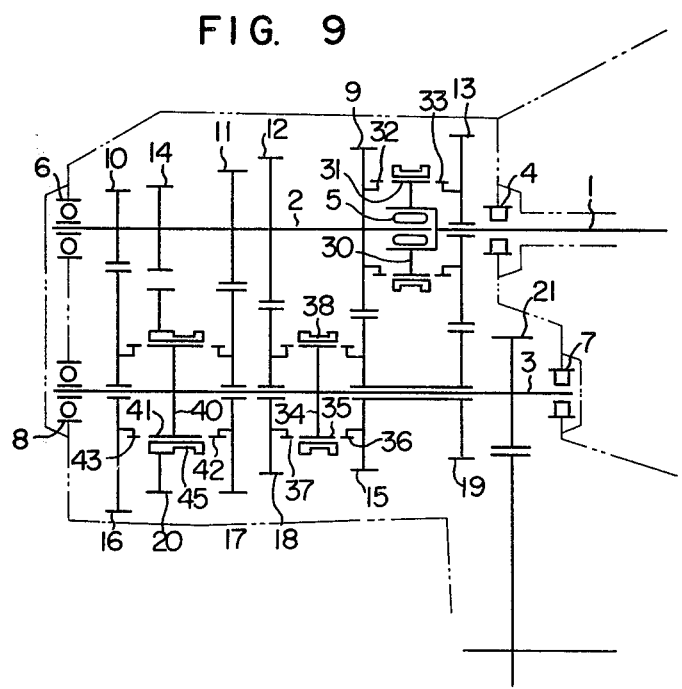
FIG. 9 shows still another embodiment of the invention.

FIG. 9 shows still another embodiment of the invention, in which the low speed range drive gear and the fourth drive gear of the embodiment as shown in FIG. 2 are substituted for each other, so as to constitute a transmission having a high speed range drive gear.

A description will be made hereinafter as to the operation of the described transmission of the invention, for each of the low speed and high speed range operations.

1. Operation in Low Speed Range

FIG. 2 shows a state of the transmission in which the high speed-low speed change-over sleeve 25 of the auxiliary speed changing gear has been shifted to select the low speed range, and the main transmission is in the neutral state. FIG. 3, 4, 5 and 6 show the same transmission with its main transmission selecting the first, second, third and the fourth gears, respectively.

The torque of the input shaft 1 is transmitted to the low speed range drive gear 9 through the hub 30 and the sleeve 25. Consequently, the low speed range driven gear 15, which is in engagement with the low speed range drive gear 9 is rotated at a speed which is reduced by a ratio determined by the numbers of teeth of these meshing gears. The rotation of the driven gear 15 is transmitted to the fourth drive gear 13, through the fourth gear 19 which is unitary with the low speed range driven gear 15, at a speed reduced by the ratios of numbers of teeth of gears. Consequently, the drive gear shaft 2, which is unitary with the fourth drive gear 13, is rotated in the same direction as the input shaft 1 but at a speed reduced by a predetermined reduction ratio.

The following table shows exemplary gear ratios of the gears incorporated in the embodiment as shown in FIGS. 2 to 6. The gear ratio of the low speed range is about 1.43. The overall reduction ratios ORR of the transmission in the low speed range are given by the following equation.

$$ORR = \frac{RLG\ (1.05)}{R4TH\ (0.75)} \times RIO$$

where, RLG is the gear ratio of the low speed range gear pair, which is 1.05 in the gear arrangement as shown in the table, R4TH is the gear ratio of fourth gears, which is 0.75 in the gear arrangement as shown in the table, and RIO represents the total gear ratios of the gear trains between the input shaft and the output shaft when the first, second, third and fourth gears are selected.

| | gear ratios of gear trains between input and output shafts (RIO) | overall reduction ratios of transmission | |
|---|---|---|---|
| | | low speed range | high speed range |
| 1st | 3.00 | 4.20 | 3.00 |
| 2nd | 1.72 | 2.41 | 1.72 |
| 3rd | 1.07 | 1.50 | 1.07 |
| 4th | 0.75 | 1.05 | 0.75 |
| reverse | 3.00 | 4.20 | 3.00 |
| gear ratio of low speed range gear pair (RLG) | 1.05 | | |

In case of the embodiment as shown in FIG. 9, the same overall reduction ratios as those of the first embodiment can be obtained by adopting the gear ratios as shown in the following table. In this case, the overall reduction ratios of the transmission in the high speed range (ORH) are derived from the following equation.

$$ORH = \frac{RHG\ (0.75)}{R4TH\ (1.05)} \times RIO$$

where, RHG represents the gear ratio of the high speed range gears which is in this case 0.75, R4TH represents the gear ratio of the fourth gears which is in this case 1.05, and RIO represents the gear ratios of gear trains between the input and output shafts.

|  | gear ratios of gear trains between input and output shafts (RIO) | overall reduction ratios of transmission | |
|---|---|---|---|
|  |  | low speed range | high speed range |
| 1st | 4.20 | 4.20 | 3.00 |
| 2nd | 2.41 | 2.41 | 1.72 |
| 3rd | 1.50 | 1.50 | 1.07 |
| 4th | 1.05 | 1.05 | 0.75 |
| reverse | 4.20 | 4.20 | 3.00 |
| gear ratio of high speed range gear pair (RHG) | 0.75 |  |  |

The rotation of the drive gear shaft 2, the speed of which is reduced as compared with that of the input shaft 1, is then transmitted to the output shaft 3 in the same way as the conventional transmission.

Figure 6:
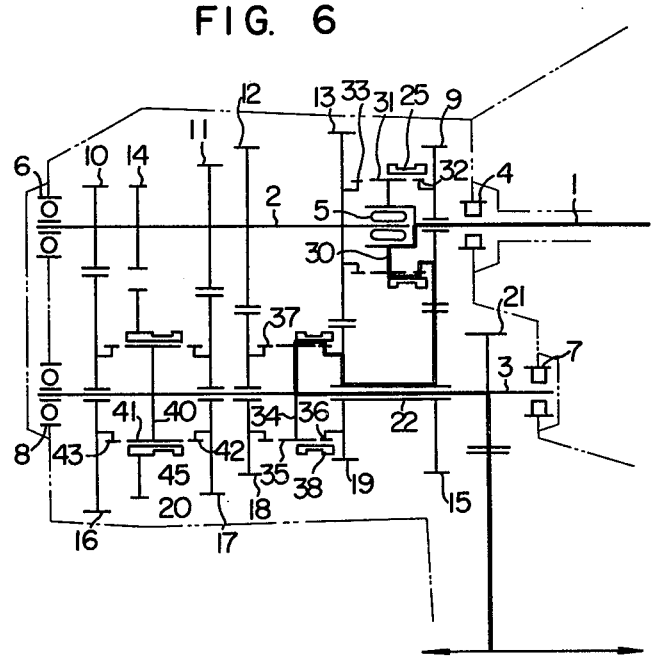

In the state of the transmission as shown in FIG. 6, in which the fourth gear is selected to be operated in the low speed range, the rotation of the low speed range driven gear 15 is transmitted to the sleeve 38 through the gear shaft 22 and the spline 36 of the fourth gear 19, and then directly to the output shaft 3.

2. Operation in High Speed Range

Figure 7:
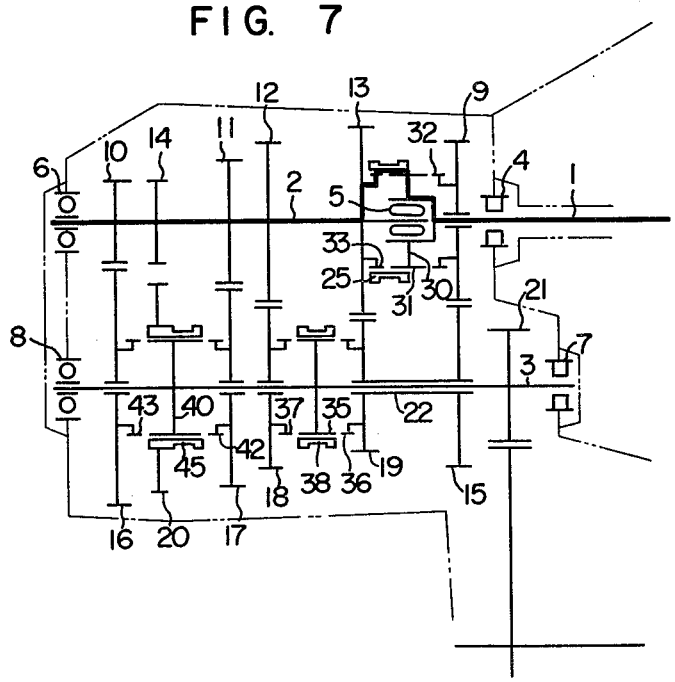

FIG. 7 shows the state of the transmission in which the auxiliary speed changing gear has been shifted to select the high speed range. In this state, the rotation of the input shaft 1 is transmitted to the drive gear shaft 2, through the hub 30, sleeve 25 and the spline 33, so that the input shaft 1 and the drive gear shaft 2 rotate as if they were made unitary. The rotation of the drive gear shaft 2 is transmitted to the output shaft 3 in the same manner as the conventional transmission.

FIG. 8 shows still another embodiment of the invention in which the high speed-low speed change-over sleeve 47 has been shifted to select the low speed range, while the main transmission is in the neutral state.

The conventional transmission equipped with an auxiliary speed changing gear necessitates three shafts, i.e. the input shaft, counter gear shaft and an output shaft, having different axis lines. However, according to the invention, the drive gear shaft is disposed coaxially with the input shaft, so that the transmission as a whole is conveniently rendered small-sized, light weight and less expensive as compared with the conventional transmission equipped with an auxiliary speed changing gear.

At the same time, since the transmission of the invention materially consists of two shafts, substantial modification of the engine installation for compensating for the undesirable reversing of the rotation of the output shaft, which is inevitably caused in the conventional transmission having three shafts, can be eliminated.

In addition, the transmission of the invention, in which either one of the high speed and low speed range gear pairs is taking place in the torque transmission, exhibits a higher transmission efficiency over the conventional transmission in which both of the high and low speed range gear pairs are always held in the meshing condition.

Further, according to the invention, the portions of the transmission constituting the auxiliary speed changing gear can be located at the outer end portion of the transmission so that the modification of the main transmission for the mounting of the auxiliary speed changing gear is conveniently diminished, by adopting a hollow drive gear shaft. In this case, the input shaft may be elongated so that it may act as a torsion bar for reducing the torsional rigidity.

What is claimed is:

1. A transmission having an auxiliary speed changing gear, comprising:
   an input shaft;
   output shaft extending in parallel with said input shaft;
   a hollow drive gear shaft disposed coaxially with said input shaft; and
   two pairs of meshing gears arranged for the torque transmission between said input shaft and said drive gear shaft;
   one of said gear pairs constituting a gear train of a high speed gear ratio, and the other constituting a gear train of a low speed gear ratio;
   said input shaft being extended through the hollow drive gear shaft and rotatably carrying at its portion remotest from the engine a low speed range drive gear, characterized by comprising:
   a hollow shaft rotatably and coaxially mounted on said output shaft,
   a low speed range driven gear for engagement with said low speed range drive gear and unitarily mounted on said hollow shaft,
   a fourth gear for engagement with a fourth drive gear and unitarily mounted on said hollow shaft, and
   a high speed-low speed change-over sleeve disposed on said input shaft and through the operation of which the torque of said input shaft is transmitted to said drive gear shaft.

2. For a front engine-front drive vehicle having wheels provided with a driving means, a horizontal transmission having an auxiliary speed changing gear, comprising:
   an input shaft;
   output shaft extending in parallel with said input shaft;
   a hollow drive gear shaft disposed coaxially with said input shaft; and
   two pairs of meshing gears arranged for the torque transmission between said input shaft and said drive gear shaft;
   one of said gear pairs constituting a gear train of a high speed gear ratio, and the other constituting a gear train of a low speed gear ratio;
   said input shaft being extended through the hollow drive gear shaft and rotatably carrying at its portion remotest from the engine a low speed range drive gear, characterized by comprising:
   a hollow shaft rotatably and coaxially mounted on said output shaft,
   a low speed range driven gear for engagement with said low speed range drive gear and unitarily mounted on said hollow shaft,
   a fourth gear for engagement with a fourth drive gear and unitarily mounted on said hollow shaft, and
   a high speed-low speed change-over sleeve disposed on said input shaft and through the operation of which the torque of said input shaft is transmitted to said drive gear shaft; and
   means for unitarily relatively coupling said output shaft with said front engine-front drive vehicle wheel driving means in driving relation thereto.

* * * * *